United States Patent [19]

Hansell

[11] Patent Number: 5,528,233
[45] Date of Patent: Jun. 18, 1996

[54] OPTICAL SERVICE TOOL APPARATUS

[75] Inventor: Robert T. Hansell, Evanston, Ill.

[73] Assignee: Motorola, Inc., Schaumburg, Ill.

[21] Appl. No.: 434,890

[22] Filed: May 4, 1995

[51] Int. Cl.⁶ .................................................. G08C 17/00
[52] U.S. Cl. ............................. 340/870.28; 340/870.02; 340/870.16
[58] Field of Search .................... 340/870.28, 870.29, 340/870.02, 870.16, 825.72; 359/154, 159

[56] References Cited

U.S. PATENT DOCUMENTS

| | | | |
|---|---|---|---|
| 4,803,632 | 2/1989 | Frew et al. | 340/870.02 |
| 4,868,893 | 9/1989 | Hammond | 340/870.28 |
| 4,887,312 | 12/1989 | Dannhaeuser | 340/870.28 |
| 5,010,335 | 4/1991 | Coppola et al. | 340/870.28 |
| 5,019,814 | 5/1991 | Biggs et al. | 340/870.28 |
| 5,371,496 | 12/1994 | Tanamachi | 340/870.28 |

Primary Examiner—Brent A. Swarthout
Assistant Examiner—Andrew Hill
Attorney, Agent, or Firm—Nicholas C. Hopman

[57] ABSTRACT

An optical service tool interface for a utility meter includes a probe (103) with a light source (115) emitting pulses of light. A first and second light receiver (113, 111) are mounted on a controller housing (102) of the meter (101). When the probe (103) is physically coupled to the meter's housing (102) the light source (115) is optically aligned with the first light receiver (113), and the second light receiver (111) is optically isolated from both the pulses of light emitted from the probe's light source (115) and any ambient light (117). A wakeup signal (215) is generated by the controller (200) dependent on the reception of pulses of light emitted by the probe (103) and received by the first light receiver (113) and optical isolation of the second receiver (111) from both the pulses of light emitted by the light source (115) and the ambient light (115). The wakeup signal (215) is used to power-on a high current consumption circuit (225) that allows the utility meter (101) to become fully functional.

5 Claims, 1 Drawing Sheet

OPTICAL SERVICE TOOL APPARATUS

FIELD OF THE INVENTION

This invention is generally directed to the field of electronic service tools, and can be used to communicate information between a stand-alone electronic unit and a host unit via optical means.

BACKGROUND OF THE INVENTION

Stand-alone battery powered units—such as utility meters are becoming increasingly prevalent. These utility meters typically have radio frequency (RF) transmitters, or other communications means on-board that transmit usage information to a host computer or other collection means. Typically, these utility meters may also require means for communicating information, independent of the RF transmitter. This independent communications means may be used for diagnostic purposes via a service tool communications interface.

Contemporary service tool communications interfaces between a stand-alone battery powered utility meter and a host computer are typically electrically connected via a mechanical connection means—such as a detachable connector. This is costly because it requires a mechanical connection means robust enough to withstand many couplings. Also, if the utility meter is mounted outdoors—which they typically are, the mechanical connection needs to withstand fairly adverse weathering and still operate reliably. As a practical matter, mechanical connections have a relatively short fatigue life.

Other service tool communications interfaces are optical in nature. These not only provide electrical isolation but can be more reliable because there is no mechanical interface to wear out as in the case of the electrically connected interface.

One problem with this type of interface is that ambient light can interfere with operation of the optical interface. For instance, solar energy might appear to be a signal that the utility meter might consider valid communications information. The problem of ambient light interference can be prevented by physically shrouding the optical reception mechanism, but this approach has all of the disadvantages of the mechanical interface such as cost and wear-out.

Another problem with an optical interface is that it can require that the utility meter has to be powered on continually in anticipation of communication reception. Continuously powering the utility meter is very undesirable because the meter's battery will be required to provide energy to run the utility meter full time. This would require a relatively large battery which is costly and bulky.

Another approach would be to operate the utility meter in a low power mode (low battery energy drain) with limited functionality. For instance, in this low power consumption mode the utility meter could periodically attempt communications with the host unit by looking for a host-transmitted signal via on-board optical components. Then, when a recognizable host-transmitted signal is received, the utility meter could be fully powered and have full functionality available. This approach requires separating the utility meter's internal circuitry into a low current consumption section that is continuously powered, and a higher current consumption section that is powered only when the low current consumption section signals that a valid host-transmitted signal has been received via the optical interface. While the utility meter is fully powered it can perform its full function which may include reception of service tool information via the optical interface and RF transmission of usage information. Then, once the service tool communications sequence is completed, the utility meter's higher current consumption section can be powered-down or put to sleep to conserve on-board battery power.

One problem with this approach is that the optical reception circuitry that needs to receive and recognize the host-transmitted signal needs to have sufficient complexity to recognize a host-transmitted signal pattern—rather than just the presence of a perceived host-transmitted signal, to prevent ambient light from invoking the utility meter's higher current consumption section. This relatively more complex circuitry requires relatively higher power consumption and adds to the bulk of the utility meter. Furthermore, because of the additionally-required complexity, the field reliability of the utility meter is reduced.

What is needed is an improved optical service tool communications interface for communicating between a stand-alone battery powered unit—such as a utility meter and a host computer that is simple, compact, reliable, insensitive to ambient light and operates with a low current consumption.

DETAILED DESCRIPTION OF A PREFERRED EMBODIMENT

In a preferred embodiment an optical service tool interface for a utility meter—or other stand-alone battery powered device is detailed. The improved mechanism can be mounted outdoors in view of ambient light with assurance that ambient light will not invoke a substantial amount of power consumption from the utility meter's internal circuitry. Furthermore, the described mechanism allows for a simple, compact, and reliable system based on an optical approach that applies two light receivers—rather than one light receiver.

Preferably, a first and second light receiver are mounted on a utility meter's controller housing. An optical probe—connected to a host device such as a computer has a light source that emits host-transmitted signal using pulses of light. When the probe is physically coupled to the utility meter's controller housing, the light source is optically aligned with the first light receiver, and the second light receiver is optically isolated from both the pulses of light emitted from the probe's light source and any ambient light present. A wakeup signal is generated by the utility meter's controller dependent on the reception of pulses of light emitted by the probe assembly and received by the first light receiver and optical isolation of the second receiver from both the pulses of light emitted by the light source and the ambient light. The wakeup signal is used to power-on a relatively high current consumption circuit that allows the utility meter to become fully functional.

While the utility meter's high current consumption circuit is fully powered it can perform its full function which may include reception of service tool information via the optical interface and RF transmission of usage information. Then, once the service tool communications sequence is completed, the utility meter's higher current consumption section can be powered-down or put to sleep to conserve on-board battery power.

Essentially, the second light receiver is used to gate, or enable a communication process between the high current consumption circuit and a host computer which is coupled to the probe assembly and causes the pulses of light to be emitted. Without this gating structure the wakeup signal could be generated by reception of light energy by the first light receiver by means of ambient light interference. This would cause the high current consumption circuit to be powered-on quite often—thus draining valuable energy from the on-board battery. Certain useful aspects of the invention can be better understood by referencing the accompanying figures.

Figure 1:
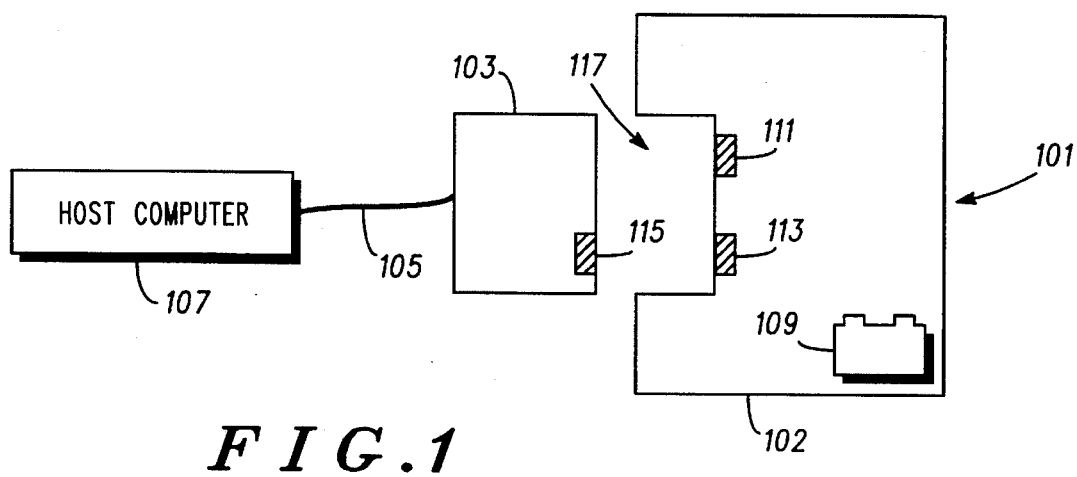
FIG. 1 is a schematic drawing of an interface between a host computer and a utility meter in accordance with a preferred embodiment of the invention.

FIG. 1 is a schematic drawing of an optical interface between a host computer and a utility meter in accordance with the preferred embodiment of the invention. A utility meter's controller housing 101 includes an on-board battery 109.

The controller housing also houses two light receivers, positioned such that a direct optical path is provided between the receivers and a light source external to the housing. The optical paths of the two light receivers 111 and 113 is such that intensity of the ambient light interference striking the two light receivers is roughly uniform. The light receivers 111 and 113 are narrow spectrum receivers (such as infrared) which are capable of discerning the pulses transmitted by the light source 115.

The light receivers provide a logical high voltage level in the presence of light within the spectrum of the light source 115 or ambient light interference 117 of reasonable intensity. The light receivers provide a logical low voltage level in the absence of such light.

A probe assembly 103 attaches to the controller housing 102 in such a way as to align the light source emitting pulses of light 115 with the optical path of the first light receiver. Simultaneously, the probe assembly 103 blocks all light from the optical path of the second light receiver 111. The host computer transmits data to the utility meter 101 by modulating a voltage level applied to the host computer to probe assembly cable 105. Within the probe assembly 103 this voltage level is buffered and is used to drive the light source 115. Data are transmitted using a serial encoding scheme, with extra pulses at the beginning of the message to "wake-up" the utility meter 101 so that it can begin receiving data.

Figure 2:
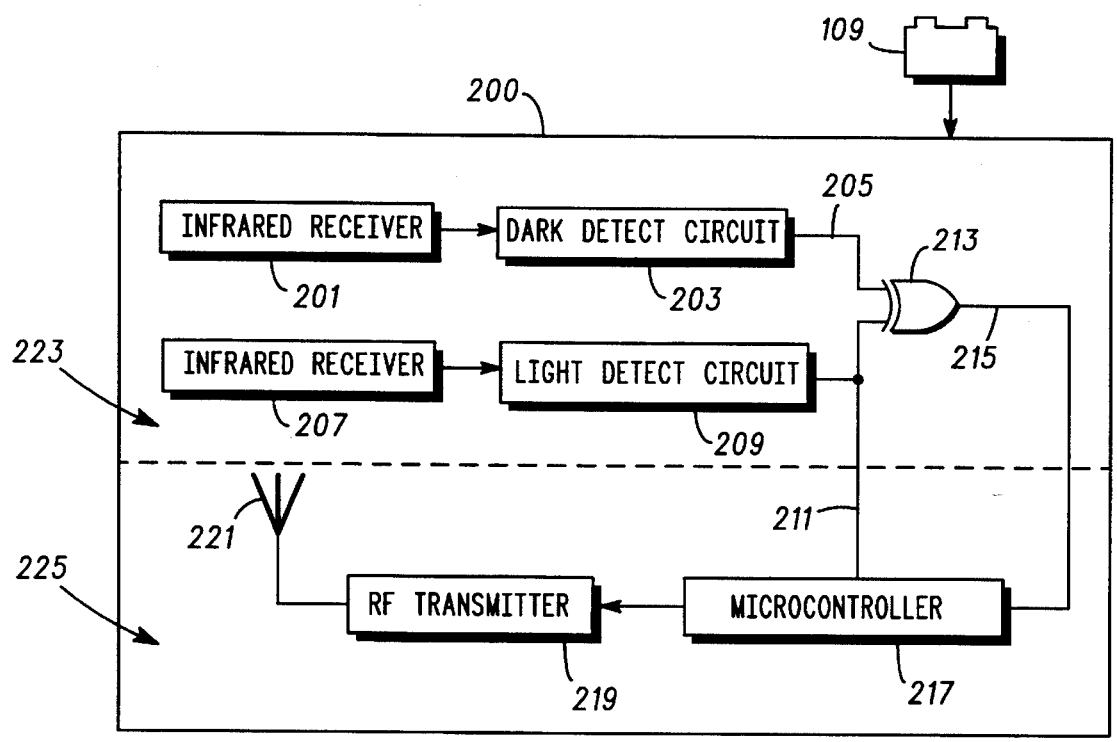
FIG. 2 is a system block diagram showing details of the utility meter introduced in FIG. 1.

FIG. 2 is a system block diagram showing the details of the utility meter introduced in FIG. 1. The circuitry of the utility meter is divided into two sections: the low current consumption section 223 which operates continuously, and the high current consumption section which is only activated when data is being sent by the host computer through the probe assembly. The controller 200 encompasses all components of the utility meter, including the means to transmit data from the meter to external receivers via radio frequency transmissions.

The low current consumption section 223 contains the circuitry required to discern between ambient light interference, blockage of light from both infrared receivers 201 and 207, and the reception of valid data from the host computer, which can only occur when infrared light pulses are applied to the first infrared receiver 207 and light is blocked from the second receiver 201. Of these three scenarios, only the last (one receiver blocked, one receiver receiving pulses) will generate a wakeup signal 215 which will cause an interrupt that will bring the microcontroller 217 out of its low-current sleep state. Examples of infrared receivers which may be used for this application would include photodiode or phototransistor devices.

Interrupt generation occurs as follows. The first infrared receiver 207 is connected to a light detect circuit 209, which includes of a comparator that generates a logical high level signal 211 in the presence of infrared light of a predetermined threshold. In the absence of infrared light below a predetermined threshold, the output of the light detect circuit 211 is a logical low or zero. The second infrared receiver is connected to a dark detect circuit 203, which includes a comparator that generates a logical high level dark detect signal 203 in the absence of infrared light. In the presence of infrared light above a predetermined threshold, the circuit generates a logical low signal. The signals from the two detector circuits 203 and 209 are gated by the exclusive-OR gate 213 to generate an active-low wakeup signal 215. Thus, when both receivers are receiving infrared light or both receivers are blocked from light, the wakeup signal is at a logical high level. In the event of data transmission from the host computer, the second infrared receiver 201 will be blocked from light, thus the dark detect signal will be high. The first infrared receiver 207 will receive an infrared pulse which will cause the light detect signal 211 to go high. These two signals gated together by 213 will cause the wakeup signal 215 to go low, thus generating an interrupt to the microcontroller 217.

The microcontroller, preferably a Motorola 68 HC05 is equipped with a "sleep" mode. After the wakeup signal 215 has been asserted to the microcontroller, the microcontroller wakes up and begins executing its serial data decoding routine, reading data through the light detect circuit 211.

After the microcontroller is running, the circuitry in the high current consumption section 225 of the controller 200 is activated, and current consumption increases substantially. The microcontroller responds to serially-encoded commands from the host computer. Some of these commands may induce the controller to transmit information via the RF transmitter section 219. Requested data is sent by modulating the RF transmitter 219 with the microcontroller 217, and the message is sent out to external receiving equipment via the transmit antenna 221. After a predetermined interval of no data received from the host computer, the microcontroller will return to sleep mode, thus conserving battery life.

An improved service tool communications interface for communicating between a stand-alone battery powered unit—such as a utility meter and a host computer that is simple, compact, reliable, insensitive to ambient light and operates with a low current consumption is highly desirable. The improved approach provides lower cost and higher reliability than a physical mechanical connection, which is prone to corrosion, breakage, and the encroachment of moisture into the controller unit. Battery life is maximized by ensuring that the meter is consuming the minimum amount of power at all times, and that ambient light will not cause the unit to accidentally wakeup and consume unnecessary power.

What is claimed is:

1. An optical service tool interface for a utility meter operating in an ambient light environment comprising:

a probe assembly having a light source emitting pulses of light; and a controller housed in an enclosure with a first light receiver positioned optically aligned with the light source, and a second light receiver positioned optically isolated from both the light source and the ambient light, wherein responsive to a coupling between the probe assembly and the controller enclosure, a wakeup signal is generated by the controller dependent on the reception of pulses of light emitted by the probe assembly and received by the first light receiver, and optical isolation of the second receiver from both the pulses of light emitted by the light source and the ambient light.

2. An interface in accordance with claim 1 wherein each of the first and second light receivers generate a first state of a signal in response to reception of light and a second state of the signal in response to an absence of light, and wherein the wakeup signal is generated by the controller when the first light receiver generates the first state of the signal while the first light receiver receives the light emitted by the light source, and the second light receiver generates the second state of the signal while the second light receiver is positioned optically isolated from both the light emitted by the light source and the ambient light.

3. An interface in accordance with claim 2 wherein the system further comprises:

a battery for providing electrical power;

a high current consumption circuit; and wherein the controller further comprises a circuit for powering the high current consumption circuit in response to reception of the wakeup signal, wherein the electrical power is consumed from the battery by the high current consumption circuit after the wakeup signal is provided.

4. An interface in accordance with claim 3 wherein the controller further comprises:

a shut-down circuit for powering-down the high current consumption circuit a predetermined time after the wakeup signal is provided.

5. An optical service tool system for a battery powered utility meter operating in an ambient light environment comprising:

a host computer for generating a communications signal;

a probe assembly coupled to the host computer for emitting pulses of light from a light source dependent on the communications signal; and a controller comprising a high current consumption circuit housed in an enclosure with a first light receiver positioned optically aligned with the light source, and a second light receiver positioned optically isolated from both the light source and the ambient light, wherein responsive to a coupling between the probe assembly and the controller enclosure, the high current consumption circuit is powered-on by the controller dependent on the reception of pulses of light emitted by the probe assembly and received by the first light receiver, and optical isolation of the second receiver from both the pulses of light emitted by the light source and the ambient light.

* * * * *